Figure 1:
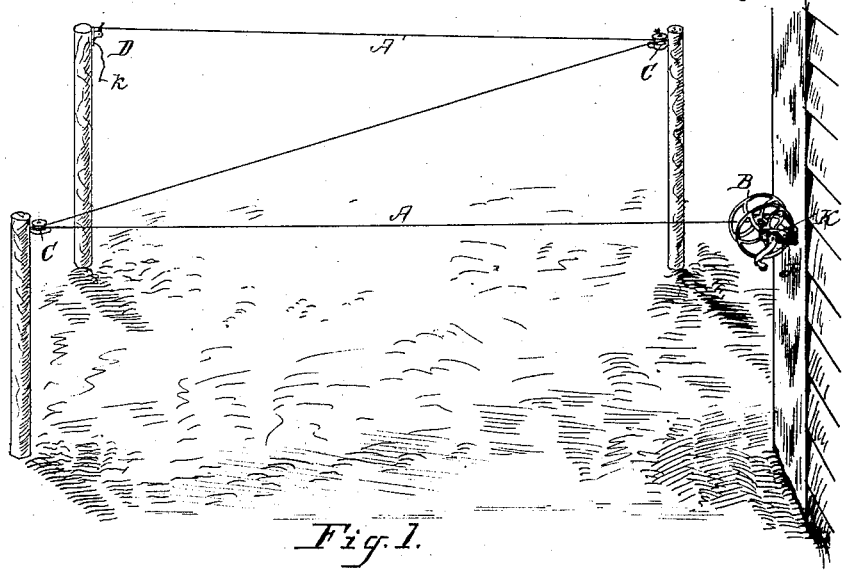

(No Model.)

J. M. ROBBINS.
CLOTHES LINE REEL.

No. 341,349. Patented May 4, 1886.

Witnesses

J. M. Robbins,
Inventor,
per
Brown Bros.
Attorneys.

UNITED STATES PATENT OFFICE.

JOHN M. ROBBINS, OF NORWOOD, MASSACHUSETTS.

CLOTHES-LINE REEL.

SPECIFICATION forming part of Letters Patent No. 341,349, dated May 4, 1886.

Application filed April 15, 1885. Serial No. 162,322. (No model.)

*To all whom it may concern:*

Be it known that I, JOHN M. ROBBINS, of Norwood, in the county of Norfolk and State of Massachusetts, have invented certain new and useful Improvements in Reels for Clothes-Lines, of which the following is a full, clear, and exact description.

The clothes-line reel of this invention is composed of a reel and supports therefor separately constructed and combined, as hereinafter particularly described, and shown in the drawings.

Figure 2:
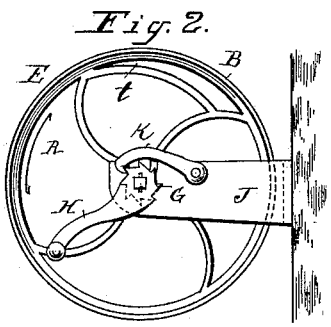
Figure 3:
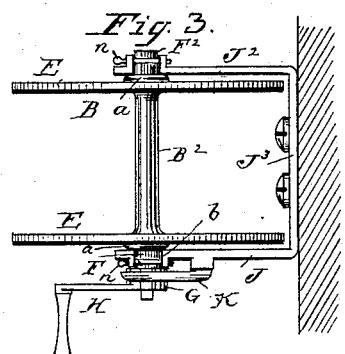
Figure 4:
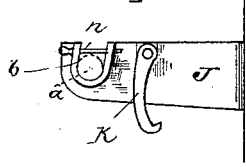

In the drawings, Figure 1 is a perspective view. Fig. 2 is an end view of the reel and of one of its supporting-brackets. Fig. 3 is a plan view. Fig. 4 is a side elevation.

In the drawings, A is a clothes-line, and B is the reel, and J J$^2$ the supporting-brackets therefor, of this invention.

The reel B is composed of a barrel, B$^2$, with a head-plate, E, at each end, having hubs or journals F F$^2$ on the outer side concentric with the barrel B$^2$.

The reel B, in all its parts above described, is cast of iron or other suitable metal in one piece, and one journal, F, has a ratchet-wheel, G, and a crank or winch handle, H, attached to it.

The reel B is hung by its journals F F$^2$ in inclining notches $b$ of supporting-brackets J J$^2$, secured to a post or side of a house or other suitable support. The incline of the notches $b$ is such that the journals located in them will be held against accidental escape, rendered more certain with cross-pins $n$, applied to the brackets.

The brackets are in one piece with a cross-bar, J$^3$, which is the part thereof by which the brackets are secured in place, and one of the brackets carries a pawl, K, arranged to engage with the ratchet G of the reel, and thus to hold the reel from turning in a direction to unwind the clothes-line wound thereon, but, when released, to allow said line to be freely unwound.

$t$ is a wedge-shaped slit in one head of the reel to receive the clothes-line when reeled and thus hold it against unreeling.

Having thus described my invention, I claim—

1. A reel for clothes-lines having a barrel or cylinder, B$^2$, heads E E, one of which is provided with a wedge-shaped slit, $t$, and outside hubs or journals F F$^2$, made of metal and cast in one piece, substantially as described.

2. In combination, a reel for clothes-lines having a barrel or cylinder, B$^2$, heads E E. one of which is provided with a wedge-shaped slit, $t$, and outside hubs or journals F F$^2$, all cast of metal in one piece, a ratchet-wheel, G, and crank or winch handle H, attached to one journal of the reel, and supporting bracket-arms J J$^2$ for the reel journals F F$^2$, both of which have a downwardly-inclining notch, $b$, to receive said journals and an attachable and detachable cross-pin, $n$, and one a pivoted pawl, K, for engagement with said ratchet-wheel, as described, for the purpose specified.

In testimony whereof I have hereunto set my hand in the presence of two subscribing witnesses.

J. M. ROBBINS.

Witnesses:
ALBERT W. BROWN,
EDWIN W. BROWN.